(12) United States Patent
Morris et al.

(10) Patent No.: US 7,438,940 B2
(45) Date of Patent: Oct. 21, 2008

(54) FILM AND FILM STRUCTURES HAVING IMPROVED OXYGEN TRANSMISSION, FORMING, AND PUNCTURE RESISTANCES

(75) Inventors: Barry Alan Morris, Wilmington, DE (US); Timothy A. Libert, Hockessin, DE (US); Julius Uradnisheck, Glen Mills, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 520 days.

(21) Appl. No.: 10/414,608

(22) Filed: Apr. 16, 2003

(65) Prior Publication Data

US 2003/0198715 A1    Oct. 23, 2003

Related U.S. Application Data

(60) Provisional application No. 60/373,798, filed on Apr. 19, 2002.

(51) Int. Cl.
*B65D 85/00* (2006.01)
*B32B 27/08* (2006.01)
*B32B 27/42* (2006.01)

(52) U.S. Cl. .................. 426/106; 428/520; 428/522

(58) Field of Classification Search .......... 428/520, 428/522
See application file for complete search history.

(56) References Cited

U.S. PATENT DOCUMENTS

| | | | | |
|---|---|---|---|---|
| 3,950,289 | A | * | 4/1976 | D'Amato et al. ............. 524/110 |
| 4,014,831 | A | * | 3/1977 | Bock et al. .................. 524/399 |
| 4,463,054 | A | * | 7/1984 | Nelson ........................ 428/458 |
| 4,956,212 | A | | 9/1990 | Bekele |
| 5,346,735 | A | | 9/1994 | Logan et al. |
| 5,387,470 | A | * | 2/1995 | Parnell et al. ............... 428/215 |
| 5,402,622 | A | | 4/1995 | Stockley et al. |
| 5,533,622 | A | | 7/1996 | Stockley et al. |
| 5,556,674 | A | | 9/1996 | Meilhon |
| 5,597,869 | A | * | 1/1997 | Wang et al. .................. 525/192 |
| 5,770,287 | A | * | 6/1998 | Miranda et al. ............. 428/40.1 |
| 5,843,540 | A | | 12/1998 | Heydarpour et al. |
| 5,885,699 | A | | 3/1999 | Watson et al. |
| 5,916,613 | A | | 6/1999 | Stockley |
| 6,630,237 | B2 | * | 10/2003 | Rivett et al. ............ 428/355 EN |

FOREIGN PATENT DOCUMENTS

| | | |
|---|---|---|
| AU | 93/44266 | 2/1994 |
| AU | 679155 | 2/1997 |
| CA | 1322949 | 10/1993 |
| CA | 2 086 478 | 2/1994 |
| EP | 0 537 079 A1 | 4/1993 |
| EP | 0 713 766 B1 | 5/1996 |
| EP | 0 600 425 B1 | 3/2000 |
| EP | 1 097 810 A2 | 5/2001 |
| WO | WO 99/28123 | 6/1999 |
| WO | WO 02-072347 A2 | 9/2002 |

OTHER PUBLICATIONS

PCT International Search Report for International application No. PCT/US 03/11877, dated Aug. 28, 2003.

* cited by examiner

*Primary Examiner*—Kevin R. Kruer

(57) ABSTRACT

A breathable film involving at least one polymeric layer of 100% neutralized ionomer containing sufficient aliphatic, mono-functional organic acid salt to essentially triple the oxygen transmission value (OTV) and/or at least one polymeric layer of metallocene polyethylene (mPE) optional blended with low density polyethylene and preferably in combination with one or more outer layers of highly neutralized ionomer (e.g., Surlyn®). Such polymeric film and polymeric film structure has sufficient oxygen permeability, water vapor transmission, formability, and structural strength to be useful in wrapping food products requiring breathable films such as case ready meat, fish, sausage, fresh produce, and the like.

16 Claims, No Drawings

# FILM AND FILM STRUCTURES HAVING IMPROVED OXYGEN TRANSMISSION, FORMING, AND PUNCTURE RESISTANCES

CROSS-REFERENCE TO RELATED APPLICATIONS

This application claims the benefit of U.S. Provisional Application No. 60/373,798, filed Apr. 19, 2002; herein incorporated by reference in its entirety.

BACKGROUND OF THE INVENTION

1. Field of the Invention

The present invention relates to a polymeric film and polymeric film structure having sufficient oxygen permeability, water vapor transmission, formability, and structural strength to be useful in wrapping food products requiring breathable films such as case ready meat, fish, sausage, fresh produce, and the like. More specifically but not by way of limitation, the present invention relates to the incorporation of a polymeric film layer involving a blend of an ionomer and fatty acid salt, metallocene polyethylene (mPE), and combinations involving the same to improve oxygen transmission through the film.

2. Description of the Related Art

The fresh red meat industry is moving towards centralized processing and packaging. This trend cuts costs and improves food safety by reducing the number of steps that the meat is handled through the value chain. The pre-packaging of fresh red meat (known as Case Ready Meat) requires special packaging considerations. Several systems are under consideration. One system involves vacuum skin-packaging whole muscle cuts and placing the individual packages into a barrier "master pack". The master pack prevents oxygen from spoiling the meat, allowing for longer distribution times associated with centralized packaging. Once the master packs reach the grocery store, personnel open the master pack and remove the individual packages. The color of fresh meat changes with concentration of oxygen. The meat is purple in the oxygen-starved environment of the master pack. Consumers prefer a bright red color that occurs with a high oxygen concentration. Thus, once the individual packages are removed from the master pack, the oxygen transmission into the package must be rapid to allow the meat to turn red quickly.

Partially neutralized ethylene/(meth)acrylic acid copolymers (e.g., Surlyn® ionomers) have superior forming properties for vacuum skin packaging, but the oxygen transmission rate through Surlyn® ionomers is too slow for this application. If the thickness of the Surlyn® film is reduced, the correct oxygen transmission rate can be achieved, but the physical properties are not good enough to ensure package integrity. Metallocene PE (especially grades with densities less than 0.91 g/cc) have high oxygen transmission rates but have poor formability and puncture resistance.

BRIEF SUMMARY OF THE INVENTION

In view of the above-mentioned problems, it has now been discovered that a one hundred percent neutralized blend of a fatty acid and ethylene acid copolymer (i.e., a blend of a fatty acid salt and 100% neutralized ionomer) will exhibit an oxygen transmission rate (OTR) and moisture vapor transmission rate (MVTR) up to six times that of a corresponding film of highly neutralized ethylene acid copolymer (i.e., ionomer film). Such fatty acid ionomer film layers, optionally in combination with other highly permeable film layers such as metallocene polyethylene having a density of less than 0.91 g/cc, result in breathable film structures. Such a film layer when combined with one or more highly neutralized ionomer film layers results in film structure having sufficient oxygen permeability, water vapor transmission, formability, and structural strength to be useful in wrapping food products requiring breathable films such as case ready meat, fish, sausage, fresh produce, and the like.

Thus, the present invention provides a packaged food product comprising an article of food requiring an oxygen and/or moist atmosphere selected from the group consisting of case ready meat, fish, sausage and fresh produce enclosed in a multilayer polymer film, wherein at least one layer of the multilayer polymeric film consists essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ $\alpha,\beta$-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein greater than 90% of all the acid moieties of (a) and of (b) are neutralized.

Preferably the aliphatic, mono-functional organic acid is selected from the group consisting of palmitic acid, stearic acid, oleic acid, and mixtures thereof and 100% of all acid moieties are nominally neutralized to the corresponding salts of magnesium, sodium, zinc or mixtures thereof.

The present invention further provides a packaged food product comprising an article of food requiring an oxygen and/or moist atmosphere selected from the group consisting of case ready meat, fish, sausage and fresh produce enclosed in a multilayer polymer film, wherein at least one layer of the multilayer polymeric film consists essentially of:

(i) a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ $\alpha,\beta$-ethylenically unsaturated carboxylic acids, and Y is a softening comonomer or ionomers of the E/X/Y copolymers wherein X is about 3 to 30 wt. % of the E/X/Y copolymer, and Y is 0 to about 30 wt. % of the E/X/Y copolymer and wherein 100% of all acid moieties of (a) and of (b) are nominally neutralized to the corresponding salts of magnesium, sodium, zinc or mixtures thereof;

(ii) a metallocene polyethylene having a density of less than 0.91 g/cc; or (iii) a blend of a metallocene polyethylene having a density of less than 0.91 g/cc and a low density polyethylene, and wherein at least one outer layer of the multilayer polymeric film consists essentially of an E/X/Y copolymer where E is derived from ethylene, X is derived from $C_3$ to $C_8$ $\alpha,\beta$-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein from 15% to 80% of the acid moieties are neutralized.

The invention also provides an oxygen permeable polymeric film consisting essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ $\alpha,\beta$-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein 100% of all the acid moieties of (a) and of (b) are nominally neutralized. Preferably the acids are neutralized to the corresponding salts of magnesium, sodium, zinc or mixtures thereof and the oxygen permeation rate of the permeable film normalized to one mil thickness is greater than 800 cc-mil/100 in$^2$·day atm.

One embodiment of the invention provides an oxygen- and moisture-permeable multilayer polymeric film comprising:
 (i) at least one polymeric layer consisting essentially of an E/X/Y copolymer where E is derived from ethylene, X is derived from $C_3$ to $C_8$ α,β-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein from 15% to 80% of the acid is neutralized;
 (ii) at least one other polymeric layer consisting essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ α,β-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein 100% of all acid moieties of (a) and of (b) are nominally neutralized to the corresponding salts of magnesium, sodium, zinc or mixtures thereof; and
 (iii) at least one additional polymeric layer consisting essentially of a metallocene polyethylene having a density of less than 0.91 g/cc; or a blend of a metallocene polyethylene having a density of less than 0.91 g/cc and a low density polyethylene.

Another specific embodiment provides an oxygen- and moisture-permeable multilayer polymeric film comprising:
 (i) at least one polymeric layer consisting essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ α,β-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein 100% of all acids of (a) and of (b) are nominally neutralized to the corresponding salts of magnesium, sodium, zinc or mixtures thereof; and
 (ii) at least one additional polymeric layer consisting essentially of a metallocene polyethylene having a density of less than 0.91 g/cc; or a blend of a metallocene polyethylene having a density of less than 0.91 g/cc and a low density polyethylene.

Still another embodiment provides an oxygen and moisture permeable multilayer polymeric film comprising:
 (i) at least one polymeric layer consisting essentially of an E/X/Y copolymer where E is derived from ethylene, X is derived from $C_3$ to $C_8$ α,β-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein from 15% to 80% of the acid is neutralized; and
 (ii) at least one other polymeric layer consisting essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ α,β-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein 100% of all acid moieties of (a) and of (b) are nominally neutralized to the corresponding salts of magnesium, sodium, zinc or mixtures thereof.

Most preferably this embodiment comprises three polymeric layers wherein both outer layers consist essentially of the E/X/Y copolymer of (i) and a middle layer consists essentially of the blend of E/X/Y copolymer and aliphatic, mono-functional organic acid 100% nominally neutralized of (ii).

And still another embodiment provides an oxygen and moisture permeable multilayer polymeric film comprising:
 (i) at least one polymeric layer consisting essentially of an E/X/Y copolymer where E is derived from ethylene, X is derived from $C_3$ to $C_8$ α,β ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein from 15% to 80% of the acid moieties are neutralized; and
 (ii) at least one additional polymeric layer consisting essentially of a metallocene polyethylene having a density of less than 0.91 g/cc; or a blend of a metallocene polyethylene having a density of less than 0.91 g/cc and a low density polyethylene.

Most preferably this embodiment comprises three polymeric layers wherein both outer layers consist essentially of the E/X/Y copolymer of (t) and a middle layer consists essentially of the metallocene polyethylene or blend of metallocene polyethylene and low density polyethylene of (ii).

DETAILED DESCRIPTION OF THE INVENTION

In this disclosure, the term "copolymer" is used to refer to polymers containing two or more different monomers. The phrase "copolymer of various monomers" means a copolymer whose units are derived from the various monomers. "Consisting essentially of" means that the recited components are essential, while smaller amounts of other components may be present to the extent that they do not detract from the operability of the present invention. The term "(meth)acrylic acid" means methacrylic acid and/or acrylic acid. Likewise, the term "(meth)acrylate" means methacrylate and/or acrylate.

All references identified throughout this Specification including those in the Description of Related Art and those to which this case claims priority are incorporated by reference as if fully set forth herein.

Acid Copolymers

The acid copolymers used in the present invention to make the ionomers are preferably 'direct' acid copolymers. They are preferably alpha olefin, particularly ethylene, $C_{3-8}$ α,β-ethylenically unsaturated carboxylic acid, particularly acrylic and methacrylic acid, copolymers. They may optionally contain a third softening monomer. By "softening", it is meant that the crystallinity is disrupted (the polymer is made less crystalline). Suitable "softening" comonomers are monomers selected from alkyl acrylate, and alkyl methacrylate, wherein the alkyl groups have from 1 to 8 carbon atoms.

The acid copolymers can be described as E/X/Y copolymers where E is ethylene, X is the α,β-ethylenically unsaturated carboxylic acid, and Y is a softening comonomer. X is preferably present in 3 to 30 (preferably 4 to 25, most preferably 5 to 20) wt. % of the polymer, and Y is present in 0 to 30 (preferably 0 to 25 or alternatively 0) wt. % of the polymer.

The ethylene acid copolymers with high levels of acid (X) are difficult to prepare in continuous polymerizers because of monomer-polymer phase separation. This difficulty can be avoided however by use of "co-solvent technology" as described in U.S. Pat. No. 5,028,674 or by employing somewhat higher pressures than those at which copolymers with lower acid levels can be prepared.

Specific acid copolymers include ethylene/(meth)acrylic acid copolymers. They also include ethylene/(meth)acrylic acid/n-butyl (meth)acrylate, ethylene/(meth)acrylic acid/isobutyl (meth)acrylate, ethylene/(meth)acrylic acid/methyl (meth)acrylate, and ethylene/(meth)acrylic acid/ethyl (meth) acrylate terpolymers.

Ionomers

The unmodified, melt processable ionomers used in this invention are prepared from acid copolymers as described above. They include partially neutralized acid copolymers, particularly ethylene/(meth)acrylic acid copolymers. The unmodified ionomers may be neutralized to any level that does not result in an intractable (not melt processible) polymer without useful physical properties. Preferably, about 15 to about 80%, preferably about 50 to about 75% of the acid moieties of the acid copolymer are neutralized by an alkali metal or an alkaline earth cation. For acid copolymers having a high acid level (for example over 15 wt. %), the percent neutralization must be lower to retain melt processibility.

Cations useful in making the unmodified ionomers are lithium, sodium, potassium, magnesium, calcium or zinc, or combinations of such cations.

Ionomers can be neutralized to levels higher than 80%, particularly when blended with the organic acids as described in this invention. For the purposes of this invention, high levels of neutralization (over 80%) are provided by adding the stoichiometric amount of a cation source needed to neutralize the target amount of acid moieties in the acid copolymer and organic acid(s) in the blend (hereinafter referred to as Nominal % Neutralization or "nominally neutralized"). One skilled in the art will appreciate that in cases of very high levels of neutralization (over 90% and especially at or near 100%), it can be difficult to determine analytically whether all of the individual acid moieties in the blend are neutralized. Similarly, it can also be difficult to determine whether any individual acid moiety is not neutralized. However, sufficient cations are made available in the blend so that, in aggregate, the indicated level of neutralization is achieved.

Organic Acids and Salts

The organic acids employed in the present invention are aliphatic, mono-functional (saturated, unsaturated, or multi-unsaturated) organic acids, particularly those having fewer than 36 carbon atoms. Also salts of these organic acids may be employed. The salts may be any of a wide variety, particularly including the barium, lithium, sodium, zinc, potassium, strontium, magnesium or calcium salts of the organic acids.

While it may be useful for the organic acids (and salts) to have a low volatility when being melt-blended with acid copolymer or ionomer, volatility has been found to not be limiting when neutralizing the blend to high levels, particularly near to or at 100%. At 100% neutralization (i.e., all acid moieties in the copolymer and organic acid are nominally neutralized), volatility simply is no longer an issue. As such, organic acids with lower carbon content can be used. It is preferred, however, that the organic acid (or salt) be non-volatile and non-migratory. It is preferred that they are agents that effectively plasticize ionic arrays and/or remove ethylene crystallinity from ethylene, $C_{3-8}$ α,β-ethylenically unsaturated carboxylic acid copolymers or ionomers thereof. By non-volatile, it is meant that they do not volatilize at temperatures of melt blending of the agent with the acid copolymer. By non-migratory, it is meant that the agent does not bloom to the surface of the polymer under normal storage conditions (ambient temperatures). Particularly useful organic acids include $C_4$ to less than $C_{36}$ (say $C_{34}$), more particularly $C_6$ to $C_{26}$, even more particularly $C_6$ to $C_{18}$, and most particularly $C_6$ to $C_{12}$, organic acids. Specific organic acids useful in the present invention include, but are not limited to, caproic acid, caprylic acid, capric acid, lauric acid, stearic acid, behenic acid, erucic acid, oleic acid, and linoleic acid. Most preferably the naturally derived organic fatty acids such as palmitic, stearic, oleic, and mixtures thereof can be conveniently employed.

Additional optional additives useful in the practice of the subject invention include acid copolymer wax (e.g., Allied wax AC143, which is believed to be an ethylene/16-18% acrylic acid copolymer with a number average molecular weight of 2,040) that assists in preventing reaction between the filler materials (e.g., ZnO) and the acid moieties in the ethylene copolymer. Other optional additives include $TiO_2$, which is used as a whitening agent; optical brighteners; surfactants; processing aids; etc.

Of notes are optional antioxidant additives that are useful in modifying the organoleptic properties (e.g. reducing odor or taste) of the blends of fatty acid and ethylene copolymers used in this invention. Antioxidants are available under the trade name Irganox as from Ciba Geigy Inc. Tarrytown, N.Y. For example, phenolic antioxidants such as IRGANOX E201, CAS Number 10191-41-0) or its derivatives may be added to the blend. IRGANOX 1010 is another antioxidant suitable for use in this invention. Thus, this invention provides packaged food products and oxygen permeable polymeric films wherein the blends of (a) one or more aliphatic, mono-functional organic acid having fewer than 36 carbon atoms or salts thereof and (b) one or more E/X/Y copolymer where E is derived from ethylene, X is derived from $C_3$ to $C_8$ α,β-ethylenically unsaturated carboxylic acids, and Y is derived from a softening comonomer, or ionomers of the E/X/Y copolymers, wherein X is about 3 to 30 wt. % of the E/X/Y copolymer, and Y is 0 to about 30 wt. % of the E/X/Y copolymer and wherein 100% of all acid moieties of (a) and of (b) are neutralized to the corresponding salts of magnesium, sodium, zinc and mixtures thereof further comprise an antioxidant.

The melt-processible, highly-neutralized acid copolymer ionomer of the present invention can be produced by (a) Melt-blending ethylene α,β-ethylenically unsaturated $C_{3-8}$ carboxylic acid copolymer(s) or ionomer(s) thereof that are not neutralized to the level that they have become intractable (not melt-processible) with one or more aliphatic, mono-functional, saturated or unsaturated organic acids having less than 36 carbon atoms or salts of the organic acids, and concurrently or subsequently (b) Adding a sufficient amount of a cation source to increase the level of neutralization of all the acid moieties (including those in the acid copolymer and in the organic acid) to greater than 90%, preferably near 100%, more preferably to 100%.

Preferably the aliphatic, mono-functional, saturated or unsaturated organic acids having less than 36 carbon atoms or salts of the organic acids are present in a range of about 5 to about 150 parts (alternatively, about 25 to about 80) parts per hundred (pph) by weight of the ethylene α,β-ethylenically unsaturated $C_{3-8}$ carboxylic acid copolymer(s) or ionomer(s) thereof. Most preferably the acid is oleic acid or stearic acid.

Neutralization of acid copolymers and organic acids in this manner (concurrently or subsequently) has been found to be the only way without the use of an inert diluent to neutralize the copolymer without loss of processability or properties such as toughness and elongation to a level higher than that which would result in loss of melt processibility and properties for the ionomer alone. For example, an acid copolymer blended with organic acid(s) can be neutralized to over 90%, preferably to about 100% or to 100% nominal neutralization without losing melt processability as can occur with acid copolymers neutralized to greater than 90%. In addition, neutralizing to about 100% or to 100% reduces the deposits of the organic acids on the mold vent observed upon molding mixtures with less than 100% neutralization.

The acid copolymer(s) or unmodified, melt-processible ionomer(s) can be melt-blended with the organic acid(s) or salt(s) in any manner known in the art. For example, a salt and pepper blend of the components can be made and the components can then be melt-blended in an extruder.

The still melt-processible, acid copolymer/organic-acid-or-salt blend can be neutralized or further neutralized by methods known in the art. For example, a Werner & Pfleiderer twin-screw extruder can be used to neutralize the acid copolymer and the organic acid at the same time.

Depending on the acid level of the co- or ter-polymer, the level of organic acid that controls processibility can be determine based on the disclosures herein. The percent organic acid needs to be higher for higher acid levels in the backbone of the co- or ter-polymer to achieve similar melt indices. See for example the following table (Table A) comparing melt indices (M.I.) obtained for various acid levels in an E/AA/14-16% nBA terpolymer modified with stearic acid. Typically, less of a lower molecular weight organic acid is needed to have the same effect as a higher amount of a higher molecular weight organic acid.

Preferably, the process employs an ethylene α,β-ethylenically unsaturated carboxylic acid copolymer or a melt-processible ionomer thereof that is an E/X/Y copolymer or melt-processible ionomer of the E/X/Y copolymer where E is ethylene, X is derived from a $C_3$ to $C_8$ α, β-ethylenically unsaturated carboxylic acid, and Y is derived from a softening comonomer wherein X is about 4-25 wt. % of the E/X/Y copolymer and Y is about 0-25 wt. % of the E/X/Y copolymer. Of particular note are copolymers wherein Y is 0 wt. % of the copolymer.

TABLE A

Comparing M.I. To Stearic Acid Level and % AA

| Acid Level | M.I. of Base Resin | Stearic Acid Level | | | | |
|---|---|---|---|---|---|---|
| | | 20% | 30% | 35% | 40% | 45% |
| 8.1% AA | 67.9 | | | 1.8 | 2 | 6 |
| About 8.3% AA | 62.5 | | | 1.08 | 1.13 | 2.25 |
| 10.1% AA | 66.8 | | | 0.62 | 1.55 | 2.22 |
| About 6.8% AA | 75 | 1.25 | 1.92 | | 6.52 | |
| About 4.9% AA | 86 | 4.9 | 9.7 | | 23.2 | |

Three other resins with the compositions recited in Table B were reacted with stearic acid and magnesium hydroxide. However, in this case, enough magnesium hydroxide was added to neutralize up to 100% of the combined acid moieties available in the copolymer and the stearic acid modifier. Ionomer/organic acid blends nominally neutralized to 100%, runs 1c and 1d, are listed in Table B. In specifically naming the E/X/Y resins the softening comonomer (e.g., nBA below) is identified second as commonly practiced in the art.

TABLE B

Magnesium Stearate Modified Magnesium Ionomers

| Run No | Resin Composition | Cation | Organic Acid (%) | Nominal % Neutralization | M.I. (g/10 min) |
|---|---|---|---|---|---|
| 1a | E/23nBA/9.6MAA | Mg | Stearic(40) | 90 | 5.2 |
| 1b | E/23nBA/9.6MAA | Mg | Stearic(40) | 95 | 3.6 |
| 1c | E/15nBA/8.5AA | Mg | Stearic(40) | 100 | 1.15 |
| 1d | E/16nBA/12AA | Mg | Stearic(40) | 100 | 0.09 |

Metallocene Polyethylene

The metallocene polyethylene (mPE) employed in the present invention can be any such polyethylene as generally known in the art provided the oxygen permeability and/or the water vapor permeability are sufficiently high to afford the requisite breathability necessary for the intended film and film structure applications of interest. More specifically, the metallocene polyethylene should have a density less than 0.91 g/cc at which densities the normalized oxygen transmission rate (OTR) at 23° C. and 50% relative humidity will be greater than about 800 cc-mil/100 in²·day·atm. This mPE can optionally be blended with other low crystalline polyolefin or amorphous polyethylenes (such as low density polyethylene, LDPE; linear low density polyethylene, LLDPE; other mPE and the like) provided the blend retains significantly high permeability.

The oxygen permeability of a multilayer film is related to the thickness and permeability of each of the layers in the following manner:

$$\frac{1}{OPV_{package}} = \frac{x_1}{OPV_1} + \frac{x_2}{OPV_2} + \quad (1)$$

where $OPV_{package}$ is the permeability of the package normalized to 1 mil, $OPV_1$ is the permeability of layer 1, $OPV_2$ the permeability of layer 1, $x_1$ is the fraction of the film thickness that comprises layer 1, and $x_2$ is the fraction of the film thickness that comprises layer 2.

By using formula (1), one can find combinations of highly permeable and less permeable materials that will achieve the desired permeability requirements of the application, while maintaining the strength and forming properties.

For example, a 2-layer film comprised of a standard ionomer and a metallocene polyethylene (mPE) with density 0.88 g/cc will have the oxygen permeability values indicated:

$OPV_{Ionomer} = 350$ cc-mil/100 in²-day $OPV_{mPE} = 2000$ cc-mil/100 in²-day.

Using formula (1), the permeability of two-layer films with different layer ratios can be determined. Example permeabilities are reported in Table C.

TABLE C

| $X_{Ionomer}$ | $X_{mPE}$ | $OPV_{package}$ |
|---|---|---|
| 0 | 1 | 2000 |
| 0.2 | 0.8 | 1029 |
| 0.4 | 0.6 | 693 |
| 0.6 | 0.4 | 522 |
| 0.8 | 0.2 | 419 |
| 1 | 0 | 350 |

Thus, it is possible to achieve a highly permeable multi-layer film by combining a skin layer of a standard ionomer with a layer of mPE. For example, a two-layer film with an OPV of 800 cc-mil/100 in$^2$-day can be prepared with a layer of ionomer 0.32 times the total thickness of the film and a layer of mPE 0.68 times the total thickness. A three-layer structure with the same OPV can be prepared using an inner layer of mPE 0.68 times the total thickness and two outer layers of ionomer, each 0.16 times the total thickness.

Furthermore, blends of highly neutralized ionomers and organic acids, as described herein, allow much more flexibility in designing a multilayer structure with the desired high permeability properties because they have three to six times the permeability of standard ionomers.

Film Manufacture

The actual making of the film, multi-layer film, and corresponding film structures according to the instant invention can generally be by any such method as practiced in the art. As such, the film and film structures can be typically cast, extruded, co-extruded and the like including orientation (either axially or biaxially) by various methodologies (e.g., blown film, bubble techniques, mechanical stretching or the like, or lamination). It should be appreciated that various additives as generally practiced in the art can be present in the respective film layers including the presence of tie layers and the like, provided their presence does not substantially alter the properties of the breathable film or film structure. Thus, it is contemplated that various additives such as antioxidants and thermal stabilizers, ultraviolet (UV) light stabilizers, pigments and dyes, fillers, anti-slip agents, plasticizers, other processing aids, and the like may be advantageously employed.

The following examples are presented to more fully demonstrate and further illustrate various aspects and features of the present invention. As such, the showings are intended to further illustrate the differences and advantages of the present invention but are not meant to be unduly limiting.

EXAMPLE 1

In order to illustrate the enhanced oxygen transmission rates associated with a film layer involving a highly neutralized blend of ionomer and fatty acid, two ten-mil thick cast films were prepared. The first film involved Ionomer 1, a terpolymer of ethylene, iso-butyl acrylate, and methacrylic acid (E/10 wt % iBA/10 wt % MAA) that was 67% neutralized to the zinc salt (commercially available from E. I. du Pont de Nemours and Company under the Surlyn® tradename). The second cast film was a blend of a terpolymer of ethylene, n-butyl acrylate, and acrylic acid (E/15 wt % nBA/8.3% AA) containing 24 wt % oleic acid with 100% of all acid functionality being neutralized to the corresponding magnesium salts. The oxygen permeation value (OPV) was measured for each cast film at 23° C. and 50% relative humidity. The resulting data expressed as a normalized oxygen permeation rate at one mil thickness are presented in Table 1 below. The results show that a film of a highly neutralized fatty acid ionomer blend has over three times the oxygen permeability value of the Ionomer 1 film.

TABLE 1

| Ionomer 1 | 414 cc-mil/100 in$^2$ · day · atm |
|---|---|
| Blend of (E/15 wt % nBA/8.3% AA) copolymer with 24 wt % oleic acid blend and 100% Mg neutralization | 1,336 cc-mil/100 in$^2$ · day · atm |

EXAMPLE 2

Thirteen 3-layer coextruded blown films were prepared on a blown film line using a 5 cm (2-inch) diameter Brampton die. Monolayer films (i.e., all three layers compositionally of the same material) as well as various 3-layer combinations of ionomer, fatty acid ionomer blends, metallocene polyethylene (mPE), and metallocene polyethylene/low density polyethylene blend were prepared using the following materials:

fatty acid ionomer blend A: (E/10% iBA10% MAA), 30% oleic acid, 6% magnesium hydroxide; 100% neutralized fatty acid ionomer blend B: (E/10% iBA/10% MM), 34% stearic acid, 6% magnesium hydroxide; 100% neutralized Ionomer 2: (E/10% MM); 54% neutralized with Na Ionomer 3: (E/15% MM); 58% neutralized with Zn Ionomer 4: (E/10% MAM/10% iBA); 73% neutralized with Zn, Metallocene polyethylene (mPE 1): octene-mPE, 0.879 g/cc, 1.0 Ml (available from Dow Chemical Company)

Low-density polyethylene (LDPE 1): 0.923 g/cc, 4 Ml

The processing temperature for the 3-layer blown film line was 210° C. but adjusted when needed to achieve nominal 3-layer target thickness of outer layer=1.2 mil, middle layer=1.6 mil, and inner layer=1.2 mil. The respective 3-layer films were tested for tensile strength properties (both in the transverse, TD, and machine, MD, direction), secant modulus, haze, gloss, static puncture resistance, slow puncture resistance, heat seal strength, thermoformability, oxygen permeation value (OPV), and water vapor transmission rate (WVTR). The resulting data are presented in the following Tables 2 through 6 below.

TABLE 2

Tensile Strength Properties

| Composition | Secant Modulus (psi) | | Yield (psi) | | Tensile (psi) | | Tensile at Break (psi) | | % E-longation at Break (psi) | |
|---|---|---|---|---|---|---|---|---|---|---|
| | mean | Stdev | Mean | Stdev | mean | Stdev | mean | Stdev | Mean | Stdev |
| Ionomer 2/Ionomer 2/Ionomer 2 (MD) | 30275 | 1206 | 74 | 28 | 4484 | 148 | 4484 | 148 | 1063 | 45 |
| Ionomer 2/Ionomer 2/Ionomer 2 (TD) | 31203 | 1215 | 1724 | 19 | 4317 | 309 | 4310 | 319 | 1103 | 59 |
| Ionomer 3/Ionomer 3/Ionomer 3 (MD) | 56256 | 2348 | 2807 | 34 | 5264 | 321 | 5227 | 348 | 741 | 44 |
| Ionomer 3/Ionomer 3/Ionomer 3 (TD) | 53550 | 1006 | 2769 | 44 | 4756 | 853 | 4747 | 872 | 695 | 151 |

TABLE 2-continued

Tensile Strength Properties

| Composition | Secant Modulus (psi) mean | Stdev | Yield (psi) Mean | Stdev | Tensile (psi) mean | Stdev | Tensile at Break (psi) mean | Stdev | % E-longation at Break (psi) Mean | Stdev |
|---|---|---|---|---|---|---|---|---|---|---|
| Blend A/Blend A/Blend A (MD) | 21173 | 1469 | 1749 | 34 | 2914 | 117 | 2907 | 129 | 1156 | 51 |
| Blend A/Blend A/Blend A (TD) | 14964 | 5507 | 1571 | 97 | 2562 | 367 | 2560 | 370 | 1214 | 224 |
| Blend B/Blend B/Blend B (MD) | 35144 | 1677 | 2391 | 36 | 2680 | 180 | 2679 | 159 | 856 | 137 |
| Blend B/Blend B/Blend B (TD) | 33349 | 2371 | 2346 | 65 | 2511 | 130 | 2502 | 137 | 865 | 82 |
| Ionomer 3/Blend A/Ionomer 3 (MD) | 42666 | 2492 | 91 | 51 | 4106 | 326 | 4084 | 317 | 782 | 66 |
| Ionomer 3/Blend A/Ionomer 3 (TD) | 37887 | 2006 | 2219 | 45 | 3912 | 205 | 3900 | 217 | 813 | 50 |
| Ionomer 3/Blend B/Ionomer 3 (MD) | 50014 | 2222 | 2669 | 86 | 4523 | 156 | 4521 | 156 | 828 | 16 |
| Ionomer 3/Blend B/Ionomer 3 (TD) | 48196 | 1245 | 2471 | 73 | 4155 | 221 | 4155 | 221 | 827 | 45 |
| Ionomer 3/mPE 1/Ionomer 3 (MD) | 36675 | 535 | 1989 | 66 | 3657 | 113 | 3627 | 107 | 710 | 44 |
| Ionomer 3/mPE 1/Ionomer 3 (TD) | 38479 | 2782 | 1987 | 43 | 3666 | 340 | 3661 | 339 | 725 | 55 |
| Ionomer 3/(mPE 1/20% LDPE 1)Ionomer 3 (MD) | 38643 | 2501 | 48 | 20 | 3608 | 145 | 3587 | 126 | 733 | 27 |
| Ionomer 3/(mPE 1/20% LDPE 1)Ionomer 3 (TD) | 35415 | 2553 | 1899 | 74 | 3728 | 330 | 3685 | 344 | 748 | 60 |
| (mPE 1/20% LDPE 1)/Same/Same (MD) | 3977 | 113 | 57 | 21 | 2498 | 322 | 2498 | 323 | 1762 | 94 |
| (double gauge due to blocking) (TD) | 3936 | 121 | 67 | 12 | 2166 | 432 | 2166 | 432 | 1718 | 101 |
| Blend A/(mPE 1/20% LDPE 1)/Blend A (MD) | 13091 | 536 | 1321 | 35 | 2149 | 273 | 2141 | 274 | 1055 | 154 |
| Blend A/(mPE 1/20% LDPE 1)/Blend A (TD) | 12044 | 845 | 1256 | 142 | 2336 | 202 | 2329 | 210 | 1207 | 56 |
| Blend B/(mPE 1/20% LDPE 1)/Blend B (MD) | 29509 | 767 | 1808 | 33 | 2375 | 112 | 2375 | 112 | 1025 | 44 |
| Blend B/(mPE 1/20% LDPE 1)/Blend B (TD) | 28551 | 858 | 1697 | 41 | 2325 | 73 | 2325 | 73 | 1081 | 43 |
| Ionomer 4/Ionomer 4/Ionomer 4 (MD) | 19625 | 850 | 106 | 26 | 5037 | 362 | 5035 | 362 | 965 | 43 |
| Ionomer 4/Ionomer 4/Ionomer 4 (TD) | 19029 | 863 | 1622 | 32 | 4636 | 375 | 4636 | 375 | 950 | 61 |
| Ionomer 3/Ionomer 4/Ionomer 3 (MD) | 42074 | 1093 | 91 | 54 | 5001 | 449 | 4994 | 456 | 795 | 72 |
| Ionomer 3/Ionomer 4/Ionomer 3 (TD) | | | 2266 | 101 | 4718 | 285 | 4683 | 270 | 788 | 40 |

*ASTM D 822; Sample Width = 2.54 cm (1 inch), 5.1 cm (2 inch) Jaw Separation; X-head = 51 cm (20 inch)/minute.

TABLE 3

Static Puncture Test

| | 011007-1, State 1 Ionomer 2/Ionomer 2/Ionomer 2 | 011007-2, State 2 Ionomer 3/Ionomer 3/Ionomer 3 | 011207-4, State 3A Blend A/Blend A/Blend A | 011307-2, State 4A Blend B/Blend B/Blend B | 011107-2, State 5A Ionomer 3/Blend A/Ionomer 3 | 011107-3, State 6A Ionomer 3/Blend B/Ionomer 3 |
|---|---|---|---|---|---|---|
| Film Thickness (mils) | 3.75 | 3.45 | 4.95 | 4.7 | 4.15 | 4.1 |
| 200 g Force (seconds to penetrate) | 3.7 | 29.1 | 15.3 | 118.3 | 1800+ | 1800+ |
| | 6.3 | 899.1 | 15.3 | 125.6 | 1800+ | 1800+ |
| | 0 | 1800+ | 15.4 | 66.7 | 1800+ | 1800+ |
| | 0 | 1800+ | 1 | 290.2 | 1800+ | 1800+ |
| | 15.2 | 1800+ | 3.6 | 815 | 1800+ | 1800+ |
| Average | 5.04 | 1265.6 | 10.1 | 283.2 | 1800+ | 1800+ |
| Std Dev | 6.3 | 794 | 7.2 | 309 | 0 | 0 |
| 150 g Force (seconds to penetrate) | | | | | | |
| Average | | | | | | |
| Std Dev | | | | | | |
| 300 g Force (seconds to penetrate) | | | | | 1255.1 | 1285.1 |
| | | | | | 90.2 | 1026.3 |
| | | | | | 415.1 | 90.7 |
| | | | | | 370.8 | 126.2 |
| | | | | | 132.9 | 169.9 |
| Average | | | | | 452.8 | 539.6 |
| Std Dev | | | | | 470 | 570 |

| | 011007-3, State 7 Ionomer 3/MPE 1/Ionomer 3 | 011107-1, State 7A Ionomer 3/(MPE 1/20% LDPE 1)/Ionomer 3 | 011207-2, State 8A (MPE 1/20% LDPE 1)/Same/Same double gauge | 011207-3, State 9A Blend A/(MPE 1-20% LDPE 1)/Blend A | 011307-1, State 10A Blend B/(MPE 1/20% LDPE 1)/Blend B | 011207-1, State 11A Ionomer 4/Ionomer 4/Ionomer 4 | 011107-4, State 12A Ionomer 3/Ionomer 4/Ionomer 3 |
|---|---|---|---|---|---|---|---|
| Film Thickness (mils) | 3.8 | 4.55 | 7.5 | 4.35 | 4.1 | 3.7 | 3.6 |
| 200 g Force | 44.4 | 1800+ | 54.6 | 0 | 9 | 0.7 | 1800+ |

TABLE 3-continued

| Static Puncture Test | | | | | | | |
|---|---|---|---|---|---|---|---|
| (seconds to penetrate) | 27.7 | 1800+ | 28.7 | 0 | 252.6 | 90.5 | 1800+ |
| | 57.2 | 1800+ | 50.7 | 0 | 39.5 | 248.4 | 1800+ |
| | 94.5 | 1800+ | 10.7 | 0 | 8.4 | 11.8 | 1800+ |
| | 167.3 | 1800+ | 7 | 0 | 83.1 | 0.5 | 1800+ |
| Average | 78.2 | 1800+ | 30.3 | 0 | 78.5 | 70.4 | 1800+ |
| Std Dev | 55.5 | 0 | 22 | 0 | 102 | 106 | 0 |
| 150 g Force (seconds to penetrate) | | | | 4.4 | | | |
| | | | | 16.7 | | | |
| | | | | 8.1 | | | |
| | | | | 14.9 | | | |
| | | | | 8.6 | | | |
| Average | | | | 10.5 | | | |
| Std Dev | | | | 5 | | | |
| 300 g Force (seconds to penetrate) | | 309 | | | | | 270.7 |
| | | 70.6 | | | | | 40.7 |
| | | 123.4 | | | | | 37.8 |
| | | 59.9 | | | | | 35.6 |
| | | 115.6 | | | | | 74.4 |
| Average | | 135.7 | | | | | 91.8 |
| Std Dev | | 101 | | | | | 101 |

TABLE 4

| | 011007-1, State 1 Ionomer 2/Ionomer 2/Ionomer 2 | 011007-2, State 2 Ionomer 3/Ionomer 3/Ionomer 3 | 011207-4, State 3A Blend A/ Blend A/Blend A | 011307-2, State 4A Blend B/ Blend B/Blend B | 011107-2, State 5A Ionomer 3/ Blend A/ Ionomer 3 | 011107-3, State 6A Ionomer 3/ Blend B/Ionomer 3 | 011107-3, State 7 Ionomer 3/ (mPE 1/Ionomer 3 |
|---|---|---|---|---|---|---|---|
| Film Thickness (mils) | 3.66 | 3.8 | 4.78 | 4.8 | 4.52 | 4.34 | 3.84 |
| Slow Puncture resistance | 4082 | 4717 | 3856 | 3357 | 5579 | 4218 | 5579 |
| Instron Probe, sharp tip | 4763 | 6033 | 3583 | 5307 | 4717 | 5579 | 4128 |
| Max. Load (gms) | 4354 | 9752 | 3901 | 3084 | 5488 | 4400 | 3856 |
| | 4264 | 5942 | 4581 | 4808 | 5171 | 6940 | 6124 |
| | 4309 | 5625 | 3946 | 3084 | 5579 | 4264 | 4082 |
| Average | 4355 | 6414 | 3973 | 3928 | 5307 | 5080 | 4754 |
| Std Dev | 250 | 1937 | 368 | 1052 | 370 | 1181 | 1026 |
| Comments: E = elong. B = break, NB = no break | E/B | E/B | E/B | E/B | E/B | E/B | E/B |
| Gloss @ 20 deg. | 72.5 | 75 | 54.6 | 39.4 | 45.3 | 71.4 | 73.4 |
| | 74.5 | 72.3 | 49.3 | 38.1 | 39 | 72.6 | 69.2 |
| | 77.6 | 78 | 52.1 | 44.2 | 38.5 | 65.3 | 66.1 |
| Average | 74.87 | 75.1 | 52 | 40.57 | 40.93 | 69.77 | 69.57 |
| Std Dev | 2.57 | 2.85 | 2.65 | 3.21 | 3.79 | 3.91 | 3.66 |
| Total Haze | 4.37 | 4.25 | 9.52 | 15.6 | 5.71 | 7.12 | 4.14 |
| | 3.66 | 4.21 | 10.1 | 15.4 | 5.4 | 6.64 | 3.58 |
| | 4.34 | 4.09 | 10.3 | 15.4 | 5.93 | 6.38 | 3.54 |
| Average | 4.12 | 4.18 | 9.97 | 15.47 | 5.68 | 6.71 | 3.75 |
| Std Dev | 0.4 | 0.08 | 0.41 | 0.12 | 0.27 | 0.38 | 0.34 |
| Internal Haze | 0.71 | 0.98 | 6.38 | 26.8 | 2.52 | 3.04 | 0.53 |
| | 0.5 | 1.91 | 6.79 | 23.6 | 2.08 | 3.18 | 0.56 |
| | 0.45 | 1.36 | 5.52 | 21.3 | 1.56 | 3.69 | 0.74 |
| Average | 0.55 | 1.42 | 6.23 | 23.9 | 2.05 | 3.3 | 0.61 |
| Std Dev | 0.14 | 0.47 | 0.65 | 2.76 | 0.48 | 0.34 | 0.11 |

| | 011107-1, State 7A Ionomer 3/ mPE 1/20% LDPE 1)/Ionomer 3 | 011207-2, State 8A (MPE 1/20% LDPE 1)/ Same/Same-double | 011207-3, State 9A Blend A/(MPE 1-20% LDPE 1)/ Blend A | 011307-1, State 10A Blend B/(MPE 1-20% LPDE 1)/Blend B | 011207-1, State 11A Ionomer 4/ Surlyn ® 9020/ Surlyn ® 9020 | 011107-4, State 12A Ionomer 3/Ionomer 4/Ionomer 3 |
|---|---|---|---|---|---|---|
| Film Thickness (mils) | 4.22 | 3.58 | 4.38 | 4.24 | 3.88 | 3.78 |
| Slow Puncture resistance | 4354 | 5352 | 2948 | 2268 | 5216 | 5443 |
| Instron Probe, sharp tip | 4536 | 4854 | 2948 | 3765 | 6214 | 5488 |
| Max. Load (gms) | 3992 | 5080 | 3583 | 2449 | 6668 | 5126 |
| | 3992 | 5262 | 3493 | 2177 | 6260 | 5171 |
| | 3357 | 4990 | 3266 | 2132 | 4990 | 6895 |

TABLE 4-continued

| | | | | | | |
|---|---|---|---|---|---|---|
| Average | 4046 | 5108 | 3248 | 2558 | 5870 | 5625 |
| Std Dev | 452 | 202 | 297 | 685 | 726 | 728 |
| Comments: E = elong. B = break, NB = no break | E/B | E/NB | E/B | E/B | E/B | E/B |
| Gloss @ 20 deg. | 71.4 | xxx | 60.6 | 34.8 | 45.2 | 51.2 |
| | 71.5 | xxx | 62.4 | 34.9 | 44.4 | 49.2 |
| | 71.2 | xxx | 56.9 | 36.5 | 42.1 | 56.8 |
| Average | 71.37 | xxx | 59.97 | 35.4 | 43.9 | 52.4 |
| Std Dev | 0.15 | xxx | 2.8 | 0.95 | 1.61 | 3.94 |
| Total Haze | 4.83 | xxx | 10.3 | 13.6 | 5.29 | 4.2 |
| | 5.36 | xxx | 9.08 | 13.1 | 6.55 | 4.53 |
| | 5.07 | xxx | 9.78 | 13.5 | 4.83 | 4.39 |
| Average | 5.09 | xxx | 9.72 | 13.4 | 5.56 | 4.37 |
| Std Dev | 0.27 | xxx | 0.61 | 0.26 | 0.89 | 0.17 |
| Internal Haze | 0.89 | xxx | 4.14 | 28.2 | 0.53 | 0.62 |
| | 1.39 | xxx | 4.78 | 27.7 | 1.13 | 0.65 |
| | 1.07 | xxx | 4.52 | 19.9 | 1.18 | 0.55 |
| Average | 1.12 | xxx | 4.48 | 25.27 | 0.95 | 0.61 |
| Std Dev | 0.25 | xxx | 0.32 | 4.65 | 0.37 | 0.05 |

TABLE 5

Heat Seal Data (max. force gm/in)

| Seal Temp °C. | Ionomer 2/Ionomer 2/Ionomer 2 peel str. | std. dev. | Blend A/Blend A/Blend A peel str. | std. dev. | Blend B/Blend B/Blend B peel str. | std. dev. |
|---|---|---|---|---|---|---|
| 120 | 32 No Seal | 19 | 155 Peel | 108 | 135 Peel | 23 |
| 130 | 221 Peel | 178 | 234 Peel | 129 | 441 Peel | 103 |
| 140 | 531 Peel | 311 | 473 Peel | 90 | 1202 Peel | 244 |
| 150 | 774 Peel | 354 | 632 Peel | 95 | 980 Peel | 185 |
| 160 | 907 Peel | 396 | 1065 Peel | 161 | 1778 Peel, Peel/Tear | 272 |
| 170 | 1456 Peel, Peel/Tear | 504 | 1120 Peel | 220 | 1892 Peel, Peel/Tear | 402 |
| 180 | 1990 Peel, El/Peel/Tear | 692 | 1448 Peel | 221 | 2433 Peel/Tear, El/Peel/Tear | 597 |
| 190 | 2967 Peel/El, El/Peel/Tear | 119 | 1989 Peel, Peel/Tear | 452 | 2705 Peel/Tear | 418 |

TABLE 6

Thermoformability

| Composition | Oven Temp (° F.) | Time in Oven (s) | Sheet Temp (° F.) | Total TH (mils) | Final TH (mils) | Final TH as % of Total TH | Depth of Cavity @ Failure |
|---|---|---|---|---|---|---|---|
| Ionomer 2/Ionomer 2/Ionomer 2 | 265 | 25 | 134 | 3.39 | 0.67 | 20 | 1.0" |
| Ionomer 3/Ionomer 3/Ionomer 3 | 265 | 25 | 139 | 3.48 | 0.76 | 22 | 1.0" |
| Blend A/Blend A/Blend A | 265 | 25 | 139 | 4.34 | 1.29 | 30 | 1.4" |
| Blend B/Blend B/Blend B | 265 | 25 | 136 | 4.65 | 1.15 | 25 | 1.2" |
| Ionomer 3/Blend A/Ionomer 3 | 265 | 25 | 139 | 3.86 | 0.82 | 21 | 1.2" |
| Ionomer 3/Blend B/Ionomer 3 | 265 | 25 | 138 | 3.71 | 0.59 | 16 | 1.4" |
| Ionomer 3/MPE 1/Ionomer 3 | 265 | 25 | 142 | 3.4 | 0.67 | 20 | 1.2" |
| Ionomer 3/(MPE 1/20% LDPE 1)Ionomer 3 | 250 | 25 | 138 | 3.84 | 0.78 | 20 | 1.2" |
| Blend A/(MPE 1/20% LDPE 1)/Blend A | 265 | 25 | 137 | 3.84 | 1.03 | 27 | 1.2" |
| Blend B/(MPE 1/20% LDPE 1)/Blend B | 265 | 25 | 139 | 3.98 | 0.92 | 23 | 1.2" |
| Ionomer 4/Ionomer 4/Ionomer 4 | 265 | 25 | 146 | 3.53 | 0.65 | 18 | 1.2" |
| Ionomer 3/Ionomer 4/Ionomer 3 | 265 | 25 | 138 | 3.52 | 0.68 | 19 | 1.2" |

TABLE 7

Permeability

| Composition | Thick mils | Time Minutes | $H_2O$ g/$m^2$/Day | $H_2O$ g/100 $in^2$/Day | Normalized to 1 mil $H_2O$ g-mil/100 $in^2$/Day |
|---|---|---|---|---|---|
| Ionomer 3/Ionomer 3/Ionomer 3 | 3.85 | 177 | 4.782 | 0.30852 | 1.19 |
| Ionomer 3/Ionomer 3/Ionomer 3 | 3.6 | 328 | 5.089 | 0.32832 | 1.18 |
| Average | 3.725 | 252.5 | 4.9355 | 0.31842 | 1.19 |
| Blend A/Blend A/Blend A | 4.95 | 227 | 23.671 | 1.52716 | 7.56 |
| Blend A/Blend A/Blend A | 3.9 | 253 | 19.302 | 1.24529 | 4.86 |
| Average | 4.425 | 240 | 21.4865 | 1.386225 | 6.13 |
| Blend B/Blend B/Blend B | 4.9 | 177 | 9.046 | 0.58361 | 2.86 |
|  | 4.5 | 202 | 9.396 | 0.60619 | 2.73 |
| Average | 4.7 | 189.5 | 9.221 | 0.5949 | 2.80 |
| Ionomer 3/(MPE 1/20% LDPE 1) Ionomer 3 | 3.6 | 429 | 6.865 | 0.4429 | 1.59 |
|  | 3.5 | 455 | 6.933 | 0.44729 | 1.57 |
| Average | 3.55 | 442 | 6.899 | 0.445095 | 1.58 |
| (MPE 1/20% LDPE 1)/Same/Same | 7.4 | 126 | 6.961 | 0.4491 | 3.32 |
| (double gauge due to blocking) | 7.05 | 152 | 7.631 | 0.49232 | 3.47 |
| Average | 7.225 | 139 | 7.296 | 0.47071 | 3.40 |

| Composition | Thick mils | Time Minutes | OTR cc/$m^2$/Day | OTR cc/100 $in^2$/Day | OPV cc-mil/100 $in^2$/Day · atm |
|---|---|---|---|---|---|
| Ionomer 3/Ionomer 3/Ionomer 3 | 3.6 | 535 | 1659.42 | 107.059 | 385.41 |
| Ionomer 3/Ionomer 3/Ionomer 3 | xxxx | xxxx | xxxxx | xxxxx |  |
| Average | 3.6 | 535 | 1659.42 | 107.059 | 385.41 |
| Blend A/Blend A/Blend A | 4.95 | 504 | 8046.7 | 519.141 | 2569.75 |
| Blend A/Blend A/Blend A | 3.9 | 478 | 7749.53 | 499.969 | 1949.88 |
| Average | 4.425 | 491 | 7898.115 | 509.555 | 2254.78 |
| Blend B/Blend B/Blend B | 4.9 | 525 | 3295.8 | 212.632 | 1041.90 |
|  | 4.5 | 488 | 3287.98 | 212.127 | 954.57 |
| Average | 4.7 | 506.5 | 3291.89 | 212.3795 | 998.18 |
| Ionomer 3/(MPE 1/20% LDPE 1) Ionomer 3 | 4.6 | 939 | 2058.8 | 132.826 | 611.00 |
|  | 4.5 | 992 | 2083.23 | 134.402 | 604.81 |
| Average | 4.55 | 965.5 | 2071.015 | 133.614 | 607.94 |
| (MPE 1/20% LDPE 1)/Same/Same | 7.15 | 923 | 5934.81 | 382.89 | 2737.66 |
| (double gauge due to blocking) | 7.3 | 981 | 5788.01 | 373.419 | 2725.96 |
| Average | 7.225 | 952 | 5861.41 | 378.1545 | 2732.17 |

EXAMPLE 3

In a manner analogous to the previous examples a series of six additional films of 100% neutralized fatty acid ionomer at various fatty acid loading and respective cation were prepared and tested. The resulting data are presented in Tables 8 and 9.

TABLE 8

Film Composition

| Blend | Acid Copolymer | Cation | Nominal % Neutralization | Conc Fatty Acid |
|---|---|---|---|---|
| C | E/10% i BA/10% MAA | Mg | 100 | 31% Oleic |
| D | E/10% i BA/10% MAA | Mg | 100 | 36 Oleic |
| E | E/15% MAA | Mg | 100 | 31 Oleic |
| F | E/15% MAA | Mg | 100 | 38 Oleic |
| G | E/10% iBA/10% MAA | Zn | 100 | 30 Oleic |
| H | E/15% MAA | Zn | 100 | 30 Oleic |

TABLE 9

Permeability

| Blend | WVTR (37.8° C., 100% RH) g-mil/100 $in^2$/Day | OPV (23° C., 50% RH) cc-mil/100 $in^2$/Day · atm |
|---|---|---|
| C | 4.85 | 2493 |
| D | 6.07 | 2739 |
| E | 4.18 | 2131 |
| F | 4.4 | 2728 |

EXAMPLE 4

A series of highly neutralized blends of ionomer and fatty acid were made from various ethylene-α,β ethylenically unsaturated carboxylic copolymers or ionomers. Reactant Resin "I" was a copolymer of ethylene and 15% methacrylic acid, neutralized 58% with Zn. Reactant Resin "J" was a copolymer of ethylene and 15% methacrylic acid. The reaction in an extruder involved various residence times in the extruder, magnesium or zinc neutralizations, and purity of oleic acid raw material. The oleic acid was either 70% pure (Technical Grade), 99.5% pure, or 99.5% pure and de-odorized as supplied by City Chemicals Inc. (West Haven, Connecticut). 300 ppm of the phenolic antioxidant IRGANOX E201 (available from Ciba Geigy Inc. Tarrytown, N.Y.) was blended into each of the oleic acid samples before the reaction. A total of 1000 ppm of IRGANOX 1010 was melt-blended into the total compositions during the reaction. Zinc was added as zinc oxide. Magnesium was added as magnesium hydroxide. The amount of zinc and magnesium were adjusted for 100% theoretical neutralization of the acid moieties on the ethylene-α,β ethylenically unsaturated carboxylic copolymers or ionomer plus the acid moieties of the added oleic acid. The amount of oleic acid in the reaction mixture was 25% and 30% for the zinc and magnesium neutralized systems respectively. The reaction was carried out at 255° C. melt temperature in a single screw extruder. The melt strand was water quenched, air-blow dried, pelletized and bagged. Immediately after bagging, 50 grams of sample pellets were placed into 8-ounce glass containers and sealed. The containers were aged 4 days at 70° C.

In a second test, the resin was extruded at 200° C. into monolayer films using a 100-second residence time. The film was blown into a tube such that the thickness of the film was 5 mils. A 13 cm×23 cm sample of film was immediately placed into a similar sized polyethylene bag for 1 week.

The samples were graded on a relative scale for odor wherein 10 indicates the highest odor and 0 indicates no odor. The results are reported in Table 10.

TABLE 10

| Carboxylic acid copolymer | Neutralizing Cation | Oleic Acid Purity | Residence Time in Reactive Extruder (seconds) | Odor in pellets after 4 days at 70° C. | Odor of film after 1 week at 22° C. |
|---|---|---|---|---|---|
| Resin I | Zn | 99.5%, deodorized | 140 | 1.5 | 0.1 |
| Resin I | Zn | 99.5%, deodorized | 178 | 2 | 0.5 |
| Resin I | Zn | 99.5%, deodorized | 120 | 2 | 3 |
| Resin I | Zn | 99.5%, deodorized | 98 | — | 0.5 |
| Resin J | Mg | 99.5%, deodorized | 116 | 1 | 0.5 |
| Resin J | Mg | 99.5%, deodorized | 226 | 5 | 0.1 |
| Resin J | Mg | 99.5%, deodorized | 78 | 1 | 0.5 |
| Resin J | Mg | 99.5% | ~180 | 0.5 | 0.5 |
| Resin J | Mg | 70% | ~180 | 4 | 4 |

The result shows the benefit of low odor for unsaturated fatty acids by use of high purity fatty acids in combination with stabilizers.

Having thus described and exemplified the invention with a certain degree of particularity, it should be appreciated that the following claims are not to be so limited but are to be afforded a scope commensurate with the wording of each element of the claim and equivalents thereof.

What is claimed:

1. An oxygen permeable polymeric film consisting essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ α,β-ethylenically unsaturated carboxylic acids, and Y is derived from a softening comonomer, or ionomers of said E/X/Y copolymers, wherein X is about 3 to 30 wt. % of said E/X/Y copolymer, and Y is 0 to about 30 wt. % of said E/X/Y copolymer and wherein 100% of all the acid moieties of (a) and of (b) are nominally neutralized wherein the oxygen permeation rate of the film normalized to one mil thickness is greater than 800 cc-mil/100 in$^2$·day·atm.

2. An oxygen permeable polymeric film of claim 1 wherein acids are neutralized to the corresponding salts of magnesium, sodium, zinc or mixtures thereof.

3. An oxygen permeable polymeric film of claim 2 wherein said blend of (a) and (b) further comprises an antioxidant.

4. An oxygen permeable polymeric film of claim 1 wherein the oxygen permeation rate of said permeable film normalized to one mil thickness is greater than 800 cc-mil/100 in$^2$·day·atm.

5. An oxygen- and moisture-permeable multilayer polymeric film wherein the oxygen permeation rate of the film normalized to one mil thickness is greater than 800 cc-mil/100 in$^2$·day·atm and the film comprises
   (i) at least one polymeric layer consisting essentially of an E/X/Y copolymer where E is derived from ethylene, X is derived from $C_3$ to $C_8$ α,β-ethylenically unsaturated carboxylic acids, and Y is derived from a softening comonomer, or ionomers of said E/X/Y copolymers, wherein X is about 3 to 30 wt. % of said E/X/Y copolymer, and Y is 0 to about 30 wt. % of said E/X/Y copolymer and wherein from 15% to 80% of the acid is neutralized;
   (ii) at least one other polymeric layer consisting essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ α,β-ethylenically unsaturated carboxylic acids, and Y is derived from a softening comonomer, or ionomers of said E/X/Y copolymers, wherein X is about 3 to 30 wt. % of said E/X/Y copolymer, and Y is 0 to about 30 wt. % of said E/X/Y copolymer and wherein 100% of all acid moieties of (a) and of (b) are nominally neutralized to the corresponding salts of magnesium, sodium, zinc or mixtures thereof; and
   (iii) at least one additional polymeric layer consisting essentially of a metallocene polyethylene having a density of less than 0.91 g/cc; or a blend of a metallocene polyethylene having a density of less than 0.91 g/cc and a low density polyethylene.

6. An oxygen and moisture permeable polymeric film of claim 5 wherein component (ii) further comprises an antioxidant.

7. An oxygen and moisture permeable multilayer polymeric film wherein the oxygen permeation rate of the film normalized to one mil thickness is greater than 800 cc-mil/100 in$^2$·day·atm and the film comprises
   (i) at least one polymeric layer consisting essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ α,β-ethylenically unsaturated carboxylic acids, and Y is derived from a softening comonomer, or ionomers of said E/X/Y copolymers, wherein X is about 3 to 30 wt. % of said E/X/Y copolymer, and Y is 0 to about 30 wt. % of said E/X/Y copolymer and wherein 100% of all acids of (a) and of (b) are nominally neutralized to the corresponding salts of magnesium, sodium, zinc or mixtures thereof; and
   (ii) at least one additional polymeric layer consisting essentially of a metallocene polyethylene having a density of less than 0.91 g/cc; or a blend of a metallocene polyethylene having a density of less than 0.91 g/cc and a low density polyethylene.

8. An oxygen and moisture permeable polymeric film of claim 7 wherein component (i) further comprises an antioxidant.

9. An oxygen and moisture permeable multilayer polymeric film wherein the oxygen permeation rate of the film normalized to one mil thickness is greater than 800 cc-mil/100 in$^2$·day·atm and the film comprises
   (i) at least one polymeric layer consisting essentially of an E/X/Y copolymer where E is derived from ethylene, X is derived from $C_3$ to $C_8$ α,β-ethylenically unsaturated carboxylic acids, and Y is derived from a softening comonomer, or ionomers of said E/X/Y copolymers, wherein X is about 3 to 30 wt. % of said E/X/Y copolymer, and Y is 0 to about 30 wt. % of said E/X/Y copolymer and wherein from 15% to 80% of the acid is neutralized; and
   (ii) at least one other polymeric layer consisting essentially of a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ α,β-ethylenically unsaturated carboxylic acids, and Y is derived from a softening comonomer, or ionomers of said E/X/Y copolymers, wherein X is about 3 to 30 wt. % of said E/X/Y copolymer, and Y is 0 to about 30 wt. % of said E/X/Y copolymer and wherein 100% of all acid moieties of (a) and of (b) are nominally neutralized to the corresponding salts of magnesium, sodium, zinc or mixtures thereof.

10. An oxygen and moisture permeable polymeric film of claim 9 wherein component (ii) further comprises an antioxidant.

11. An oxygen and moisture permeable multilayer polymeric film of claim 9 comprising three polymeric layers wherein both outer layers consist essentially of said E/X/Y copolymer of (i) and a middle layer consists essentially of said blend of E/X/Y copolymer and aliphatic, mono-functional organic acid 100% nominally neutralized of (ii).

12. A packaged food product comprising an article of food enclosed in a multilayer polymer film, wherein
at least one layer of said film consists essentially of a blend of (a) one or more aliphatic, mono-functional organic acids having fewer than 36 carbon atoms or salts thereof and (b) one or more E/X/Y copolymers;
E is derived from ethylene, X is derived from $C_3$ to $C_8$ α,β-ethylenically unsaturated carboxylic acids, and Y is derived from a softening comonomer, or ionomers of said E/X/Y copolymers, wherein X is about 3 to 30 wt. % of said E/X/Y copolymer, and Y is 0 to about 30 wt. % of said E/X/Y copolymer;
100% of all the acid moieties of (a) and of (b) are neutralized to the corresponding salts of magnesium, sodium, zinc or mixtures thereof and
the oxygen permeation rate of the film normalized to one mil thickness is greater than 800 cc-mil/100 in²·day·atm.

13. A packaged food product of claim 12 wherein said aliphatic, mono-functional organic acid is selected from the group consisting of palmitic acid, stearic acid, oleic acid, and mixtures thereof.

14. A packaged food product of claim 13 wherein said blend of (a) and (b) further comprises an antioxidant.

15. A packaged food product comprising an article of food enclosed in a multilayer polymer film, wherein the oxygen permeation rate of the film normalized to one mil thickness is greater than 800 cc-mil/100 in²*day*atm and at least one layer of said film consists essentially of:
(i) a blend of (a) one or more aliphatic, mono-functional organic acids having fewer than 36 carbon atoms or salts thereof and (b) one or more E/X/Y copolymers where E is derived from ethylene, X is derived from $C_3$ to $C_8$ α,β-ethylenically unsaturated carboxylic acids, and Y is derived from a softening comonomer, or ionomers of said E/X/Y copolymers, wherein X is about 3 to 30 wt. % of said E/X/Y copolymer, and Y is 0 to about 30 wt. % of said E/X/Y copolymer and wherein 100% of all acid moieties of (a) and of (b) are nominally neutralized to the corresponding salts of magnesium, sodium, zinc or mixtures thereof; and
(ii) at least one additional polymeric layer consisting essentially of a metallocene polyethylene.

16. A packaged food product of claim 15 wherein (i) further comprises an antioxidant.

* * * * *